No. 828,267. PATENTED AUG. 7, 1906.
L. D. BENNER.
CORN PLANTER.
APPLICATION FILED FEB. 17, 1905.
3 SHEETS—SHEET 1.
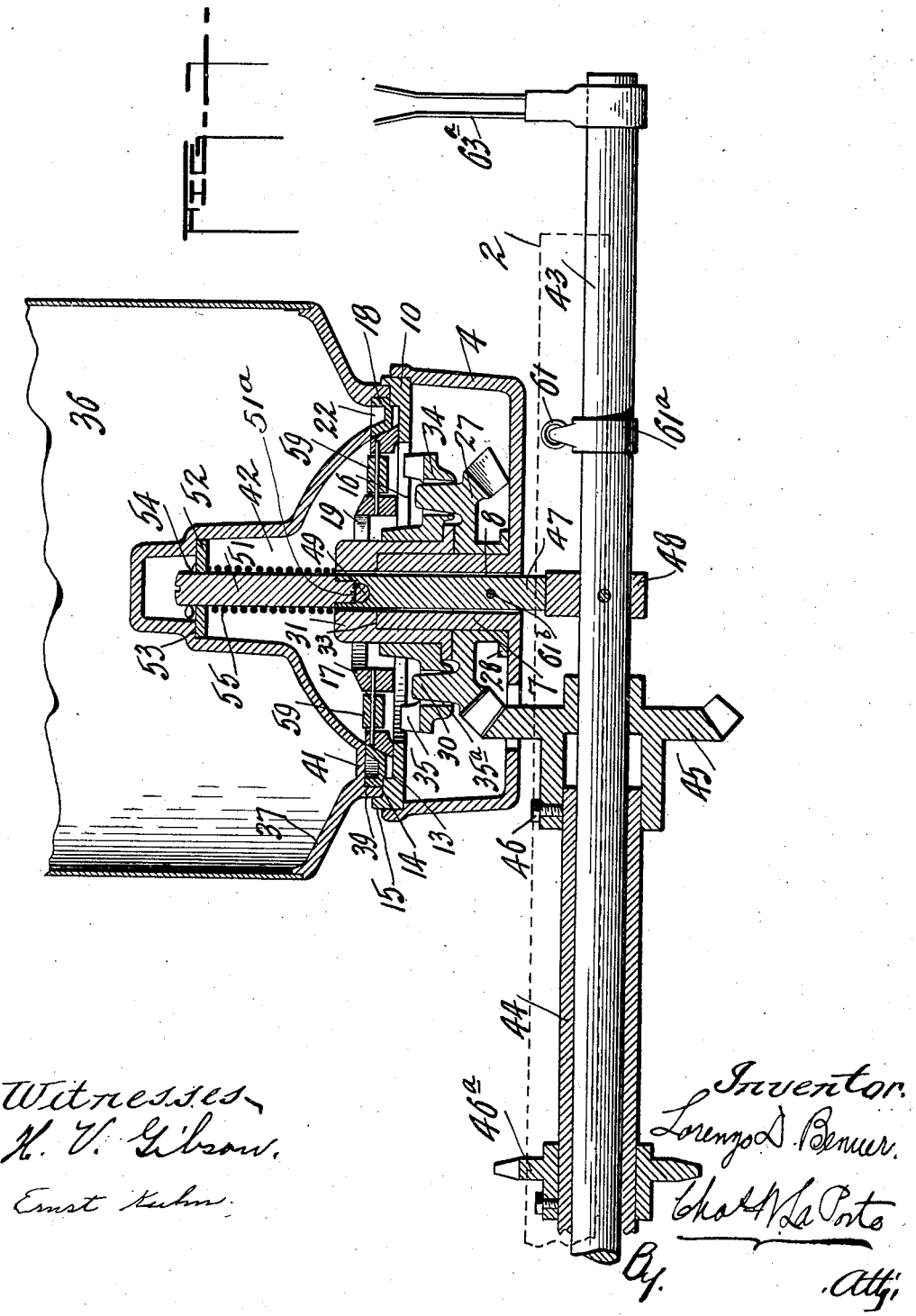

No. 828,267. PATENTED AUG. 7, 1906.
L. D. BENNER.
CORN PLANTER.
APPLICATION FILED FEB. 17, 1905.
3 SHEETS—SHEET 2.
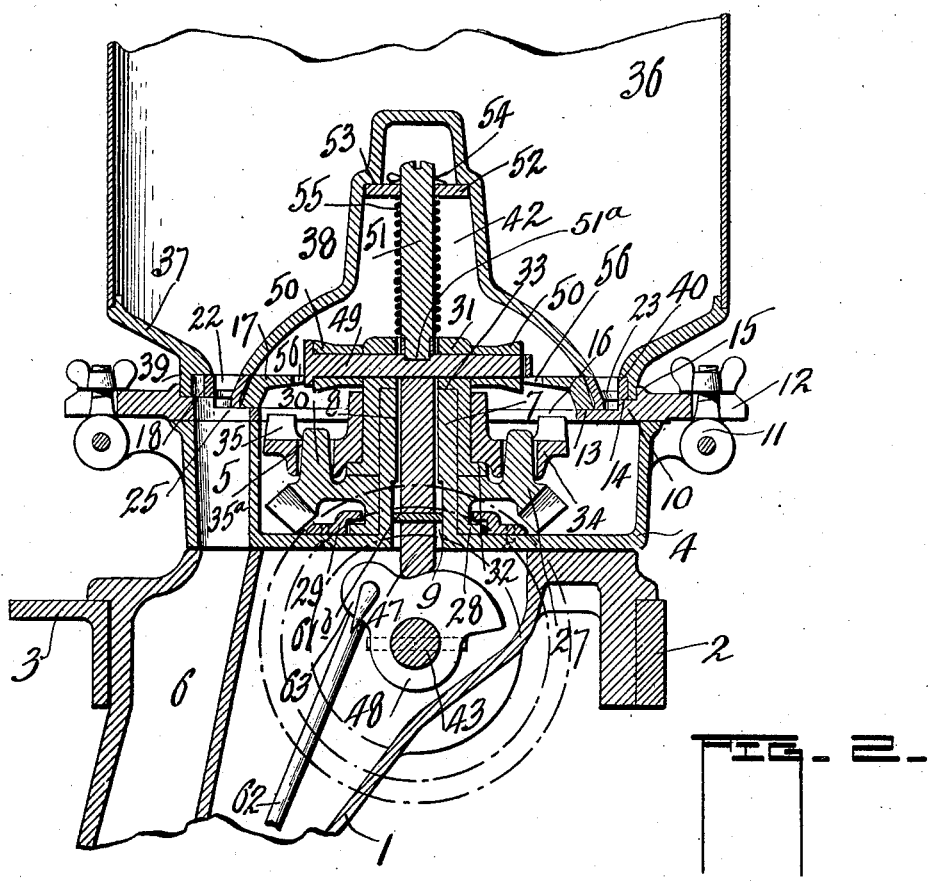
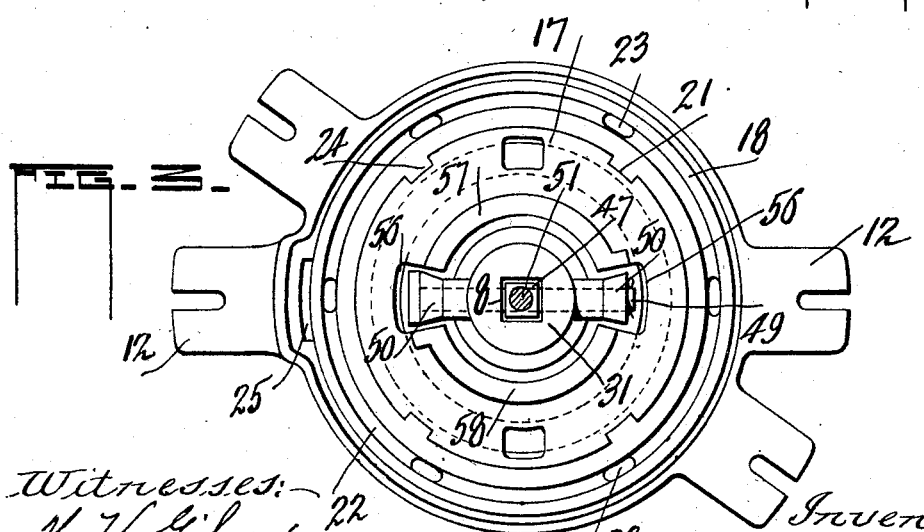
Witnesses:
H. V. Gibson,
Ernst Kuhn.
Inventor.
Lorenzo D. Benner,
By Chas. W. LaPorte,
Atty.

No. 828,267. PATENTED AUG. 7, 1906.
L. D. BENNER.
CORN PLANTER.
APPLICATION FILED FEB. 17, 1905.
3 SHEETS—SHEET 3.
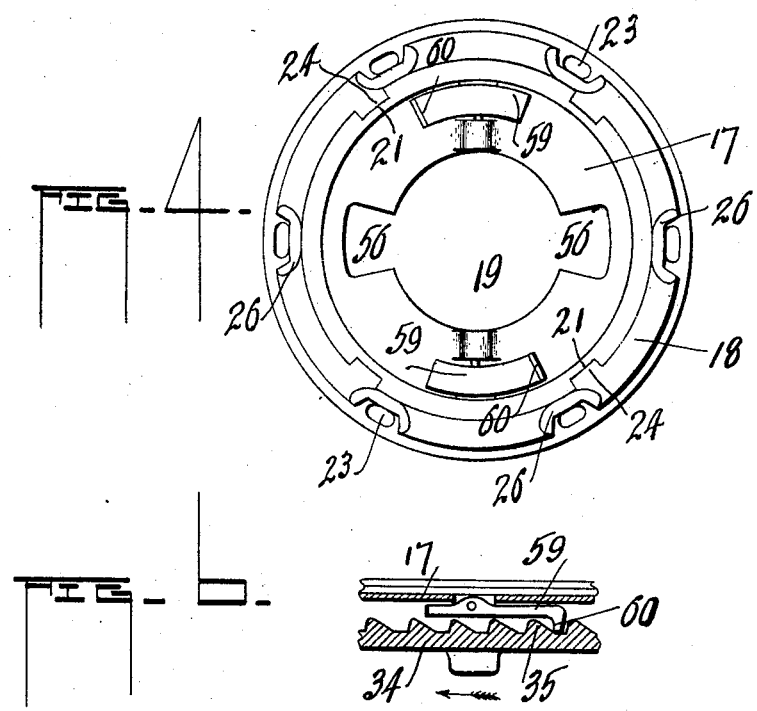
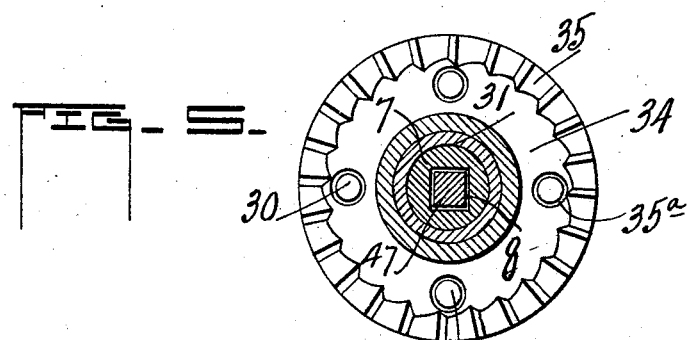
Witnesses:
H. V. Gibson
Ernst Kuhn
Inventor
Lorenzo D. Benner
By Thos. N. LaPorte
Atty.

UNITED STATES PATENT OFFICE.

LORENZO D. BENNER, OF PEORIA, ILLINOIS.

CORN-PLANTER.

No. 828,267.     Specification of Letters Patent.     Patented Aug. 7, 1906.

Application filed February 17, 1905. Serial No. 246,019.

*To all whom it may concern:*

Be it known that I, LORENZO D. BENNER, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention has reference to corn-planters, and has for its object to produce a planter in which is obviated certain objectionable features of that class of planters employing clutch devices for obtaining an intermittent movement of the rotating shaft which transmits power to the seed-plates. This objection is overcome by producing a rotating shaft which is continuously rotated from a driven axle by introducing gearing between said shaft and the seed-plate, the transmission of power from the gearing to the seed-plate being controlled by a plunger or similar member operating through such gearing, the plunger adapted to be actuated by a rock-shaft movable by a tappet-wire by foot or by hand power. (Not shown.)

A further object of the invention is to simplify the construction and operation of the seeding devices by providing a rock-shaft and a sleeve-shaft revoluble on said rock-shaft. However, the shafts may be separated; but for convenience in changing the planter to drop at different widths the sleeve-shaft is preferable. Gearing is provided between the said sleeve and the seed-plates, and a member is movable through the gearing for controlling communication between said plate and the gearing, means on the rock-shaft for raising the member to lock the gearing with the plate, and means on the member for releasing the member, and thereby release the gearing from the plate.

In simplifying the construction of the mechanism and its arrangement beneath the plate for actuating said plate I have so disposed the parts that it is necessary to raise the plunger to actuate the plate. In planting in hills the plunger is intermittingly raised, giving a corresponding rotation to the plate. In drilling the plunger will be raised and so held. To raise and hold the plunger, all that is necessary is to throw the tappet-arm and lock it in that position by any suitable means. The plate and connections above the same coöperating therewith controls its point of stopping, which is accomplished by causing the plunger to drop.

The invention herein is an improvement upon the planter shown and described in the patent granted to me on November 1, 1904, No. 773,705, and the nature of the improvement consists in the locking connections between the plate and the gearing for actuating the same and to means for positively stopping and retaining the plate in a fixed position upon the disconnecting of the gearing therefrom.

A further object of the invention is a plate formed of a center driving-ring adapted to have an intermittent connection with suitable gearing and to an outer ring having an interlocking connection with the center ring and provided with a series of seed-cells spaced at intervals therein.

For a more full description of the invention herein and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a vertical sectional view through a hopper and the seeding mechanism therein, also showing the tappet-arm shaft and the sleeve thereon from which rotary motion is imparted to the seeding-plate in the hopper. Fig. 2 is a vertical sectional view of a hopper and the seeding devices, being at right angles to that shown in Fig. 1, in addition showing a portion of a shank. Fig. 3 is a top plan view of a base or removable seed-supporting plate, also the inner and outer rings forming the plate supported thereby, together with a part of the mechanism for driving the plate. Fig. 4 is a bottom plan view of the inner and outer rings of the plate in locked relation, also showing pawls pivoted to the inner ring which are adapted to be engaged by ratchet mechanism in the gearing. Fig. 5 is a top plan view of a ratchet-gear in section, showing the manner of connecting the same to suitable gearing. Fig. 6 is a detail in section, showing the ratchet-gear in engagement with the pawls of the inner ring of the plate; and Fig. 7 is a sectional detail showing the inner and outer plates connected, also the contour of a portion of the upper surface of the inner ring.

In the drawings, 1 indicates a shank, which may be of any suitable form, its upper forward and rear portions being connected to and supported by the frame parts 2 and 3.

4 denotes a false or removable bottom of a seed box or hopper and by some suitable means (not shown) is adapted to be attached to the upper end of the shank. The false bottom 4 is provided with a seed-duct 5 to one side thereof, which at its lower end communicates with a seed-conducting tube 6, extending part way or through the entire length of the shank 1. Centrally disposed in the bottom 4 and extending upwardly is a tubular stud or member 7, which is preferably formed integral with the bottom 4 and is provided with a squared opening 8, extending longitudinally through the said stud 7. The lower portion of the opening in the stud is grooved upon opposite sides, as at 9, for a purpose to be described.

10 indicates a base-plate which is supported on the false bottom 4 and detachably secured thereto by means of the thumb-nut and pivot-bolts 11, carried by the false bottom 4 and adapted to engage the slotted lugs 12 of the said base-plate. (See Fig. 2.) The base-plate is of annular ring formation, having the inner annular depression or seat portion 13, the outer annular depression or seat portion 14, and the annular flange portion 15. The said base-plate is further provided with a substantially central annular open way 16, through which it is adapted to project certain mechanism to be described, which is employed for actuating the plate supported by and rotatable on the base-plate 10.

The seed-plate to which reference has been made consists of a driving-ring 17 and a driven ring 18. The former is the inner or center portion of the plate, being provided with the annular cut-out portion 19 and the tapered peripheral edge 20, provided with the notched or seat portions 21. The latter is the outer ring portion, which is provided with an annular channel-feedway 22, in which is arranged a series of seed-cells, (denoted as 23 and spaced at desirable intervals.) The outer peripheral edge of the ring 18 has a square face, while its inner face is tapered to conform to the outer edge of the ring 17, and from the inner edge of the ring 18 at suitable intervals project the lugs 24, which are adapted to engage the notches or seat portion 21 of the ring 17 for the purpose of locking the same together, so that any motion being imparted to ring 17 it insures the ring 18 rotating therewith. The walls of the feedway 22 of the ring 18 correspond substantially to the outer and inner walls of the said ring—that is, one wall is square and the other tapered, while the cells 23 are oblong—and by such formation direct kernels of corn down on edge or upon their sides into the said cells 23. The ring portion 18 of the said plate has its outer portion resting and movable upon the annular ledge 14 of the base-plate, while the inner portion thereof rests upon and is movable on the ledge 13. This construction and arrangement places the seed-cells above the ledge 13, so that as kernels of corn find their way through the cells 23 they will be moved around on the ledge until the cells coincide with a feed duct or opening 25 in the base-plate 10, which is above the ducts 5 and 6 described, when the corn will be forced into and find its way through the ducts described into the shank 1 by the usual ejector. (Not shown.) At a point on the ring 18 where the cells 23 are pierced or formed there is provided on its under face (see Fig. 4,) with guards 26, which serve as a pocket beneath that portion of the ring 18 in which kernels of corn will lodge and be conveyed to the opening 25 in the plate 10.

On the tubular stud or member 7 is journaled a bevel gear-wheel 27, the hub of which is provided with the flange portion 28, which is engaged by the semicircular securing-plates 29, in a suitable manner attached to the base of the false bottom 4. The semicircular plates 29 serve to retain the gear 27 always in meshing relation with a gear to be described and prevents any upward movement of the said gear when parts carried above the same and which have a slidable and locking relation therewith are moved up or down. Extending up from the upper face of the said gear-wheel is shown the stems or lugs 30, of which there is a series and arranged for the purposes which will soon become apparent.

Encircling the upper portion of the tubular stud or member 7 is shown a sleeve 31, the base of which rests upon the hub of the gear-annular flange portion 32, the upper inner wheel 27 and is provided with the lower face of the sleeve 31 being grooved to form an offset 33, which rests upon the upper edge of the stud 7 when the said sleeve is in its lowermost position. Encircling the sleeve 31 is a ratchet-wheel 34, the same being rotatably mounted upon the said sleeve and whose hub portion is designed to rest upon the flange 32 of the sleeve 31. The ratchet-wheel 34 is provided with the ratchet-teeth 35 upon its upper face, and in the body of said ratchet-wheel is provided a series of holes 35$^a$, through which extend the stems 30 of the bevel-gear 27.

The seed-hopper is indicated as 36 and may be of any suitable form; but for convenience I have shown the cylindrical casing 36 supported at its lower end on the annular ring 37, which is attached to or may form a part of a cap-plate 38, the same having the annular flange portion 39, which rests upon the base-plate 10 and lies between the peripheral face of the ring 18 of the seed-plate and the flange portion 12 of the base-plate, the ring 37 being provided with a ledge 40, overlying the upper outer edge of the ring 18 of the seed-plate, as shown in the drawings. The ring 37 is connected to the body of the cap-plate 38, as shown, by the web 41. The main body of the cap-plate 38, as shown, is dome-shaped, covering the ring-section 17 of the seed-plate and operative parts disposed centrally of the said ring 17. The dome centrally merges into the vertically-extended and tubular portion 42, in which are housed parts to be described. The cap-plate and its outer ring portion may be locked to the base-plate in any suitable manner. No means is herein shown; but it is suggested that means similar to the devices employed for locking the base-plate to the false bottom might be adopted.

43 denotes a rock-shaft extending from one side of the planter-frame to the other and is suitably journaled in bearings formed on the planter 1 or attached to the frame parts. On this shaft is revolubly carried a sleeve 44, and on the opposite ends of said sleeve are carried the bevel gear-wheels 45, adapted to be longitudinally adjustable thereon and affixed thereto by means of set-screws 46, the said bevel gear-wheels extending up through the base of the false bottom 4 and are in continuous mesh with the gear-wheels 27. It will be seen that any movement imparted to the sleeve 44 will be correspondingly imparted through its gears 45 to the gears 27. The sleeve 44 is continuously rotated, which also means that the bevel gear-wheels 27 and the ratchet-wheels 35 by reason of the stud connection 30 of the gears 27 with the ratchets will be continuously rotated. On the sleeve 44 is shown a sprocket-wheel 46ª, affixed thereto and adapted to receive its power from the axle of the planter. By continuously rotating the sleeve 44 I am enabled to avoid or obviate the use of clutch mechanism which is usually employed where the driving-shaft is intermittingly actuated and the sprocket continuously driven.

47 denotes a vertically-disposed plunger or bar which is carried up through the tubular stud or member 7 and the upper end of the sleeve 31, and the lower end thereof projects through the false bottom 4 and rests upon a cam 48, which is secured on the rock-shaft 43. The upper end of the plunger just referred to is preferably flush with the upper end of the sleeve 31, and passing through the sleeve and also the upper end of the plunger 47 is a horizontal rod or spindle 49, on the outer opposite ends of which are secured to rotate thereon the beveled-face rollers 50, which coöperate with the ring portion 17 of the plate in a manner to be described.

Extending up from and secured to the upper end of the plunger 47 is a rod or stem 51, which is in reality an extension of the plunger 47. The lower end of the stem 51 engages a recess 51ª in the rod or spindle 49 and locks the rod through such engagement in the plunger, (see Fig. 2,) and the upper end of the rod or stem 51 passes through a collar or washer 52, which is held in position on the said rod by means of the cotter-pin 54, and the collar or washer 52, through which the rod 51 is carried, is adapted to engage with an offset or shoulder 53, formed in the tubular portion 42 of the dome of the cap-plate. On the rod or stem 51, between the washer 52 and the upper end of the sleeve 31, is coiled a compression-spring 55, which insures the prompt return of the plunger to its lowermost position when the rollers 50 coincide with the oppositely-disposed radial notches or cut-out portion 56 of the ring 17. It is adapted in each half-revolution of the plate when the rollers 50 coincide with the radial notches or cut-out portion 56 of the ring 47 with the roller that the sleeve 31 and the plunger 47 will drop of their own weight; but to insure these parts returning to their initial position the spring 55 has been arranged to operate in the manner specified.

When the plate composed of the rings 17 and 18 are at rest, the plunger, the sleeve, and ratchet-gear are in their lowermost positions, with the stem or rod 49 and its rollers 50 substantially half-way through the inner plate 17, holding the said plate and component parts in an inoperative position. To adapt the rod 49 and its rollers 50 to pass partially through the ring 17, the body of said ring is provided with oppositely-disposed radial notches or cut-out portions 56, both of which merge into the annular cut-out portion 19 of the said plate, and the upper face of the said plate is provided with the oppositely-placed and oppositely-directed tapered ridges 57 and 58, which bound the edge of the cut-out portion 19, and it is upon these ridges that the rollers 50 ride when the plunger and rollers are raised through the actuation of the cam 48, as will be described.

For the purpose of locking the seed-plate to the ratchet-gear 35 when the plunger, sleeve, and ratchet are raised I have provided the pawls 59, pivoted to the under side of the ring 17 of the plate somewhat as seen in Fig. 6, the said pawls being provided with the depending tooth portions 60, which are engaged by the teeth of the ratchet-wheel, as seen in Fig. 6, and rotated in the direction of the arrow indicated in said last-mentioned figure.

The operation of rotating the seed-plate may be briefly described as follows: When the shaft 43 is actuated, the cam 48 will be partially rotated and its cam-surface, engaging or riding beneath the lower end of the plunger 47, will cause the same to be raised and by such movement project the stem 49 and the rollers 50 up through the open way 19 and the cut-out portions 56 of the ring 17, carrying with them the sleeve 31, also the ratchet-wheel 34, bringing the teeth of the ratchet in engagement with the pawls 59 of the ring 17 of the said seed-plate and, through the continuous rotation of the bevel-gear 27 in manner as described, rotation will be imparted to the seed-plate through the connection of the pawls 59 with the teeth of the ratchet-wheel, the pins 30 of the gear 27 being of sufficient length to permit the ratchet-wheel to be raised and yet not be disconnected from the stems of the driving gear-wheel. At the instant the plunger reaches its greatest height the rock-shaft will begin to return to its first or normal position, carrying with it the cam aforesaid. This is accomplished, preferably, by means of a spring 61, one end of which is secured to the bar 2 of the main planter-frame and its opposite end attached to an arm $61^a$ on the rock-shaft. In the movement of the plate and its driving ring portion 17 the rollers 50 have contact with the tapered ridges 57 and 58 of the said ring, serving to retain the plate and the ratchet in engagement and the gearing raised for the purpose of rotating the said plate. The ridges 57 and 58 of the plate are of such contour and so positioned that as the plate starts the rollers will be on the highest points of the said ridges, and in the continued rotation of the plate or one-half revolution of the same will ride off of the lowermost points of the said ridges into the cut-out portions 56 and simultaneously therewith drop the plunger, the sleeve, and ratchet, disconnecting the ratchet from the pawls of the plate and causing the lower end of the plunger to rest on the cam, as before, remaining so until the next actuation of the rock-shaft for actuating the cam, plunger, and operative parts connected therewith. The dropping of the rollers 50 into the cut-out portions 56 of the ring 17 stops the plate instantly, preventing further rotation or movement in either direction by reason of the said rollers being disposed between the matching walls of said cut-out portions 56. The plunger and component parts are assisted in their downward movement as the rollers coincide with the cut-out portions 56 of the plate by means of the spring 55 bearing between the collar 52 and the top of the sleeve 31, all of which, it is believed, is understood.

The construction of the seed-plate with only a pair of cut-out portions 56 is such that the plate will make one-half revolution and then stop. Should it be desired to rotate the plate one-quarter of a revolution, four of such cut-out portions, such as 56, would be provided and the gearing for driving the same made in proportion, the result of which, it is believed, is clearly apparent.

To prevent the plunger 47 from becoming dislodged should the cap-plate be removed and the box tipped over, also to obviate any unforeseen accidents occurring whereby the plunger might be displaced, a pin $61^b$ is carried through the plunger and is adapted to ride up and down in the groove 9 in the stud 7.

While there is no valve mechanism shown in the shank 1, it is to be understood such devices would be used, and to operate the same a rod 62 is shown carried in the said shank, its upper end attached to an ear 63 of the cam 48 and by the same operated at predetermined intervals.

Referring again to the seed-plates and the rings 17 and 18 forming the same, interchangeable rings may be provided at a very small expense where it has been necessary heretofore to replace full-size plates. The ring 18 is here shown having six seed-cells, whereas other rings may be made with a varying number of cells and of various sizes, which may be capable of being interlocked with the ring 17 in substitution of the one here shown.

In the drawings a tappet-arm $63^a$ is shown secured to the end of the rock-shaft 43, adapted to be actuated by a suitable tappet-wire, (not shown;) but it is to be understood and while certain devices are not shown it is intended that the rock-shaft may be actuated by hand or foot power, if desired, the said rock-shaft being returned after actuation through the spring hereinbefore described.

If it is desired to employ the planter for the purpose of drilling, it is to be noted that it is only necessary to retain the plunger and its component parts in a raised position, which will impart a continuous rotation to the seed-plate. This may be accomplished by throwing the tappet and locking the same. However, the mode of doing this is not material, as those versed in the art will comprehend the changing of the planter from hill-dropping to drilling, and that by the use of the improvements such as herein enumerated none of the parts of the seed mechanism or planter need be disturbed when the planter is being turned at the end of the field.

It is obvious that various changes may be made and that the usual parts of a complete planter may be added to make a complete and operative machine. It has not been thought necessary to show more than one box nor to show the ground-wheels and the axle, because they form no part of this invention, and I do not wish to be confined to the specific showing made, but to embody all that will come within the scope and spirit of the invention herein.

Having thus fully described my invention, what I claim, and desire to secure by Letters Patent of the United States, is—

1. In combination, a seed-plate consisting of an inner and an outer ring, the latter being provided with seed-cells, a plunger, gearing, means for actuating the plunger, and means actuated by said plunger for imparting motion from the gearing to the said seed-plate.

2. In combination, a seed-plate consisting of an inner and an outer ring, the latter being provided with seed-cells, a plunger, gearing, means for actuating the plunger, and means actuated by said plunger for imparting motion from the gearing to the inner ring of the said seed-plate.

3. In combination, a seed-plate consisting of an inner and an outer ring having an interlocking connection and one of said rings provided with seed-cells, a plunger having vertical movement through the inner ring, means for raising said plunger, gearing, and means in operative connection with the plunger and gearing whereby when the plunger is raised motion will be imparted from the gearing to the seed-plate.

4. In combination, a seed-plate consisting of an inner and an outer ring, detachably connected, a plunger vertically movable through the inner ring of said plate, a cam for raising said plunger, means for operating said cam, and means controlled by the action of said plunger for operating the said seed-plate.

5. In combination, a seed-plate consisting of an inner and an outer ring detachably connected, the outer ring provided with an annular groove in which is arranged a series of seed-cells, a plunger vertically movable through the inner ring of said plate, a cam for raising said plunger, means for operating said cam, and means controlled by the action of said plunger for operating the said seed-plate.

6. In combination, a continuously-driven shaft, an intermittingly-actuated seed-plate consisting of an inner and an outer ring detachably connected, the outer ring provided with an annular groove in which is arranged a series of seed-cells, gearing for rotating said seed-plate from said shaft, a vertically-movable member controlling connection between the shaft and seed-plate, and means for moving said member.

7. In combination, a seed-plate, a member having vertical movement through said plate, means for raising and projecting the member through the plate, a transverse stem secured to the said member adapted to have engagement with the upper surface of the plate to retain the member raised for a predetermined period, and driving parts controlled by the movement of said member for actuating the said seed-plate when the member is raised.

8. In combination, a seed-plate, a member having vertical movement through said plate, means for raising and projecting the member through the plate, a transverse stem secured to the upper end of said member and rollers secured on the ends of said stem adapted to have engagement with the upper surface of the plate to retain the member raised for a predetermined period, and driving parts controlled by the movement of said member for actuating the said plate when the member is raised.

9. In combination, a seed-plate provided with a central opening and with tapered ridges bounding the said opening, a member having vertical movement through the opening in the plate, means attached to the said member adapted when the same is raised to engage the ridges aforesaid of the plate, means for moving the member, and driving parts controlled by the movement of said member for actuating the said plate when said member is raised.

10. In combination, a seed-plate provided with a central opening also an annular groove in which is arranged a series of seed-cells, tapered ridges bounding the opposite edges of the opening, a member having vertical movement through the opening in the plate, means attached to the said member adapted when the same is raised to engage the ridges aforesaid of the plate, means for raising the member, and driving parts controlled by the movement of said member for actuating the said plate when said member is raised.

11. In combination, a seed-plate provided with a central opening and a pair of oppositely-disposed cut-out portions, a member adapted to have vertical movement through the central opening of the plate, oppositely-projected extensions from the member movable through the cut-out portions aforesaid of the said plate, the said projections during a partial rotation of the plate adapted to engage the upper surface of the plate between the cut-out portions, means for actuating the plunger, and means controlled by the action of the plunger for operating said seed-plate.

12. In combination, a seed-plate having a central opening and a pair of oppositely-disposed cut-out portions, a member adapted to have vertical movement through the central opening of the plate, a stem carried transversely through the member and movable through the cut-out portion aforesaid of the plate, rollers carried on the outer ends of said stem, adapted when the member and its stem are raised to engage with the surface of the plate and lock the plunger and plate in engagement until the plate moves into a position where its cut-out portions coincide with the rollers aforesaid when said rollers will drop into such cut-out portions and lock the plate against rotation, means for actuating the plunger, and means controlled by the action of the plunger for operating said seed-plate.

13. In combination, a seed-plate, a rock-shaft, a plunger operating through said plate and controlling the mechanism for rotating the plate, a member on the rock-shaft normally engaging the said plunger, means for rocking said shaft to raise the plunger, and a member secured to the upper end of the plunger operating synchronously with the reverse of the rock-shaft to engage with the upper face of the plate to lock the plunger raised, the said plate provided with means, which, after a partial rotation of the same releases the member aforesaid thereby causing the plunger and its member to drop and stop the rotation of the plate.

14. In a planter, the combination of a seed-hopper having a false bottom, a base-plate supported upon said bottom and having a discharge-opening, a seed-plate revolubly supported on said base-plate, the seed-plate comprising an outer ring provided with a series of seed-cells, and an inner driving-ring, and means for imparting an intermittent motion to the said plate.

15. In a planter, the combination of a seed-hopper having a false bottom, a base-plate supported upon said bottom, a seed-plate revolubly supported on said base-plate, the same consisting of an inner and an outer ring, one of which is the driving portion and the other provided with a series of seed-cells, and means for imparting motion to the said plate.

16. In a planter, the combination of a seed-hopper having a false bottom, a base-plate supported upon said bottom, a seed-plate revolubly supported on said base-plate, the same consisting of an outer ring portion provided with seed-cells, and an inner ring portion adapted to have an intermittent connection with gearing for driving the same, continuously-driven gearing supported in the bottom aforesaid, and means for connecting the gearing to the plate for imparting an intermittent motion to the same.

17. In a planter, a seed-plate consisting of an outer and an inner ring, the outer ring provided with a series of seed-cells, pawls pivoted to the under side of the inner ring, and driving mechanism adapted to have an intermittent connection with the pawls of the ring aforesaid for driving both the inner and outer rings.

18. In a planter, a seed-plate consisting of an outer and an inner ring, the outer ring having a depressed annular groove and provided with a series of seed-cells, and means carried by the inner ring adapted to have an intermittent connection with suitable driving parts for actuating both the inner and outer rings.

19. In a planter, a seed-plate consisting of an outer and an inner ring, the outer ring provided with a series of seed-cells, lugs on one of the rings adapted to have an interlocking connection with cut-out portions of the opposite ring, pawls pivoted to the under side of the inner ring, and driving mechanism adapted to have an intermittent connection with the pawls of the ring aforesaid for driving both the inner and outer rings.

20. In a planter, a seed-plate consisting of an outer and an inner ring, the outer ring provided with a series of seed-cells, pawls pivoted to the under side of the inner ring, driving mechanism adapted to have intermittent connection with the pawls, and semi-circular tapered ridges upon the upper surface of the inner ring, all combined for the purposes set forth.

21. In a planter, the combination of a base-plate of annular formation provided with a pair of annular depressions one within the other, a seed-plate revolubly supported on the base-plate, consisting of an inner and an outer ring, the outer ring having a portion movable upon the outer annular depression of the base-plate and a portion movable upon the inner annular depression thereof, the inner ring also movable upon the inner annular depression of said base-plate, and means for intermittingly actuating the said seed-plate.

22. In combination, a rock-shaft, a seed-plate, a plunger operating through the plate and adapted to govern the rotation of the seed-plate, a cam on the rock-shaft for raising the plunger, a member on the plunger adapted when the latter is raised to engage the upper surface of the plate and hold the said plunger raised for a predetermined period, means for releasing the plunger and member from the plate, and a connecting-rod attached to the cam aforesaid, substantially for the purposes specified.

23. In a planter, a base provided with a tubular stem, gearing surrounding the stem, a seed-plate revolubly supported at the head of the stem, a plunger movably carried in said stem, means for projecting the plunger upwardly and through the center of the seed-plate, a member carried transversely of and at the head of the plunger, adapted when the plunger and member are raised to engage the upper surface of the plate and to connect the gearing aforesaid to the plate, and means for lowering the plunger and member to facilitate in releasing the gearing and stopping the action of the plate.

24. In a planter, the combination of a hopper-bottom, a hollow stem extending up from the bottom, a gear-wheel revoluble on said stem, means for actuating said gear-wheel, a sleeve encircling said stem and vertically movable thereon, a ratchet-wheel on the sleeve and connected with the gear aforesaid, a plunger movable through the hollow stem, a rod carried transversely through the upper end of said sleeve and plunger with portions protruding upon opposite sides of the sleeve, a seed-plate revoluble around the upper end of sleeve and plunger, means for projecting the sleeve, plunger and rod through said plate and thereby lock the ratchet to the plate for a predetermined period, means for actuating the plunger, means for releasing the rod from the plate, and means for causing the plunger and its component parts to drop after the release of the plate.

25. In a planter, the combination of a hopper-bottom, a hollow stem extending up from the bottom, gearing surrounding the said stem, a rod carried transversely through the stem, connections between rod and gearing, a seed-plate revolubly mounted at the head of the plunger, means for projecting the plunger and rod through the plate, and through the said rod to connect and retain the gearing in contact with the plate at a predetermined period, a cap-plate supported above the seed-plate, plunger and rod, an extension from the plunger carried up in the cap-plate held under tension of a spring, adapted when the plate releases the rod to return the plunger to its normal position and release the gearing from the plate.

In testimony whereof I affix my signature in presence of two witnesses.

LORENZO D. BENNER.

Witnesses:
H. V. GIBSON,
ROBERT N. MCCORMICK.